UNITED STATES PATENT OFFICE.

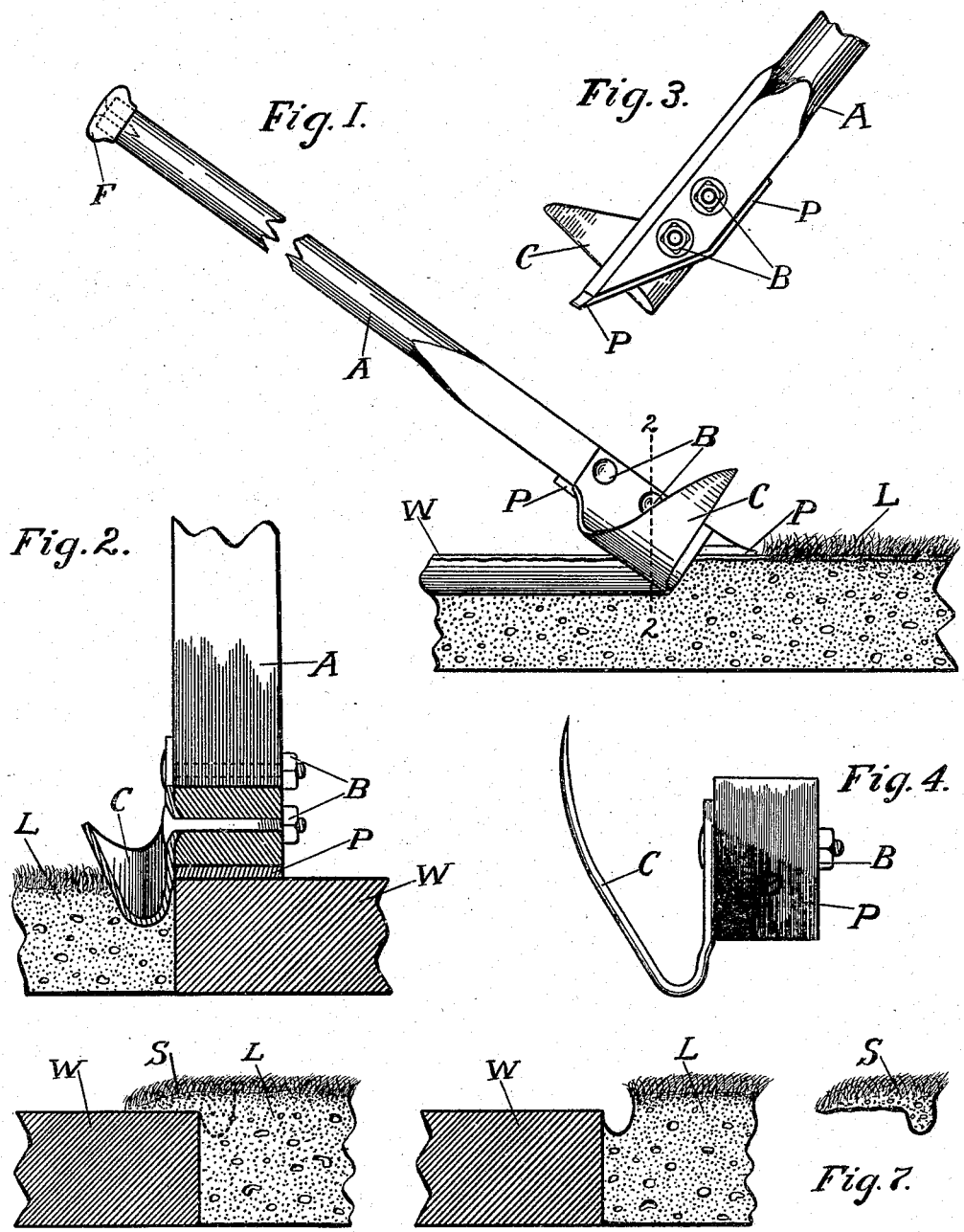

WILLIAM LOUDEN, OF FAIRFIELD, IOWA.

LAWN-TRIMMER.

No. 930,396.  Specification of Letters Patent.  Patented Aug. 10, 1909.

Application filed September 3, 1908. Serial No. 451,510.

*To all whom it may concern:*

Be it known that I, WILLIAM LOUDEN, a citizen of the United States, residing at Fairfield, in the county of Jefferson and State of Iowa, have invented a new and useful Improvement in Lawn-Trimmers, of which the following is a specification.

My invention relates to devices designed to trim the edges of lawns or sods adjacent to walks or curbs, and it consists of the novel features herein described and more specifically pointed out in the claims.

In the accompanying drawings forming a part of this specification, Figure 1 is a side view of a trimmer embodying my invention, said view also showing a section of the lawn upon which the trimmer is being used, and its handle being broken to shorten the drawing. Fig. 2 is a transverse section on line 2—2 of Fig. 1. Fig. 3 is a view of the other side of the lower end of the trimmer, the upper part of the handle being broken away. Fig. 4, is a lower end view of the trimmer. Fig. 5 is a section of a walk or curbing and the adjoining lawn as it sometimes appears before using the trimmer. Fig. 6 is the same after using. Fig. 7 is a sectional view of the piece of sod which is cut out by the trimmer.

Referring to the drawings, A represents a handle having a U-shaped cutter C secured to its lower end. This end of the handle is beveled rearwardly on its lower side so as to form a pointed end and has a plate P secured thereto so as to project beyond the extreme point of the handle. This end of the handle is preferably made rectangular and the cutter C is secured directly to one of the rectangular sides by bolts B adjacent to the beveled end. The parts of the cutter where the bolts pass through are preferably dished so as to receive the heads of the bolts, and recesses are made in the sides of the handle to receive the dished portions of the cutter blade.

The portion of the cutter blade bolted to the handle is preferably offset slightly from the lower part so as to provide more clearance for the sod being cut and having to pass between the sides of the cutter. The central outer portion of the cutter is also set on a slight incline to provide additional clearance while the upper outer portion is inwardly curved to prevent running too much into the sod when it inclines much above the walk.

The upper end of the handle is preferably fitted with a knob shaped ferrule so as to make it easier on the hands in pushing the cutter into the sod. This is fitted over the end of the handle and is held in position by a screw, as shown by dotted lines. The cutter is secured to the side of the handle so as to stand behind its pointed end and so its attached end will not extend above the upper side of the handle. It is also extended below the beveled part of the handle so as to form a guide against the edge of the walk W, while the plate P will form a guide on the upper face of the walk.

Sometimes the sod of the lawn L will grow over the edge of the walk, as shown in Fig. 5. In such cases the sharp point of the handle can be run under the sod on the walk before it is cut, and will lift it up, and the cutter will cut it out as shown in Fig. 6, the piece being lifted up by the point of the handle passing under it and cut out by the cutter being shown in Fig. 7. The part removed by the cutter with the aid of the extended point is shown by S.

Had the end of the handle been blunt or had a wheel been used or had the attached end of the cutter been extended above the handle, this could not have been done so readily, if at all, but the end of the handle being pointed and the cutter being bolted to one side, and set back from the pointed end so as to offer no obstruction this may be easily and readily done, and in a neat and effective manner. Even when the sod does not grow over the walk it is desirable to have the end of the handle pointed and extended in front of the cutter so as to clear away any cut glass or other debris which may be upon the walk.

What I claim is:—

1. A lawn trimmer, comprising a handle having its lower end beveled rearwardly on its under side so as to form a penetrating point and a U shaped cutter secured to one side of the handle adjacent to the beveled end, and below the upper edge thereof, whereby no obstruction is formed to the passage of the sod detached by the cutter over the upper edge of the handle.

2. A lawn trimmer comprising a handle having its lower end beveled rearwardly on its under side so as to form a penetrating point and a U shaped cutter secured to one side of the handle adjacent to the beveled end so its central portion will extend below the beveled part of the handle and its attached end will not extend above the upper edge of the handle whereby the sod detached by the cutter may pass without obstruction over the upper edge of the handle.

3. A lawn trimmer comprising a handle havings its lower end beveled rearwardly on its under side so as to form a penetrating point, and a U shaped cutter secured to one side of the handle adjacent to the beveled end, and below the upper edge thereof, a metal plate secured to the beveled edge and projecting beyond the point of the handle, whereby the sod may be lifted and when detached by the cutter, pass without obstruction over the upper edge of the handle.

WILLIAM LOUDEN.

Witnesses:
H. M. MILLER,
R. B. LOUDEN.